United States Patent [19]
Lee et al.

[11] Patent Number: 5,654,944
[45] Date of Patent: Aug. 5, 1997

[54] METHOD FOR REPRODUCING A RESERVED PROGRAM AND COMPACT DISC PLAYER EMPLOYING THE SAME

[75] Inventors: Deok-hyun Lee, Seoul; Hae-min Choi, Kwachon, both of Rep. of Korea

[73] Assignee: Samsung Electronics Co., Ltd., Kyungki-do, Rep. of Korea

[21] Appl. No.: 458,623

[22] Filed: Jun. 2, 1995

[30] Foreign Application Priority Data

Jul. 26, 1994 [KR] Rep. of Korea ............... 1994-18068

[51] Int. Cl.$^6$ ........................................... G11B 7/00
[52] U.S. Cl. .................................... 369/32; 369/60
[58] Field of Search ........................... 369/32, 48, 54, 369/59, 60, 58, 47, 34

[56] References Cited

U.S. PATENT DOCUMENTS

| | | | |
|---|---|---|---|
| 4,862,439 | 8/1989 | Ando et al. | 369/32 |
| 5,051,973 | 9/1991 | Shiba et al. | 369/36 |
| 5,365,503 | 11/1994 | Goto | 369/32 |
| 5,367,510 | 11/1994 | Ando | 369/32 |
| 5,446,714 | 8/1995 | Yoshio et al. | 369/32 |
| 5,477,516 | 12/1995 | Takezawa | 369/32 |
| 5,502,703 | 3/1996 | Yamada et al. | 369/60 |

FOREIGN PATENT DOCUMENTS

| | | | |
|---|---|---|---|
| 552806 | 7/1993 | European Pat. Off. | 369/60 |
| WO92/12515 | 7/1992 | WIPO . | |

*Primary Examiner*—Nabil Hindi
*Attorney, Agent, or Firm*—Sughrue, Mion, Zinn, Macpeak & Seas

[57] ABSTRACT

A reproducing method of a reserved program and a compact disc player employing the method is provided. The method of reproducing a reserved program includes the steps of reading table of contents (TOC) information stored on a disc loaded in the compact disc player, storing the read TOC in a TOC memory, reading a reserved program recorded on the disc and storing the read program in a program buffer memory. Further, the method includes the steps of reproducing and outputting the program stored in the program buffer memory and simultaneously moving a pickup device to the starting location of the next reserved program according to the TOC information stored in the TOC memory. Furthermore, the method includes the steps of reading a reserved program from the location of the pickup device to store the read-out program in the program buffer memory after reproduction of the reserved program stored in the program buffer memory ends. The waiting time for a program search is reduced by locating a pickup device at the starting location of the next reserved program while at the same time a program stored in the program buffer memory is reproduced, and by reproducing the next reserved program shortly after termination of the reproduction of the program stored in the program buffer memory.

8 Claims, 5 Drawing Sheets

METHOD FOR REPRODUCING A RESERVED PROGRAM AND COMPACT DISC PLAYER EMPLOYING THE SAME

BACKGROUND OF THE INVENTION

The present invention relates to a compact disc player, and more particularly, to a method of reproducing a reserved program in which searching time, associated with reproducing a reserved program, is reduced, and to a compact disc player adopting the method.

In a lead-in area of a compact disc, a table of contents (TOC) is recorded. The TOC contains information relating to, for example, the number of recorded programs, the recording location (leading address) of each program, play time per program, etc. When the disc is loaded in a compact disc player, the TOC information written in the lead-in area is read and stored in a TOC memory for reference when a program is reproduced. Using the TOC, a compact disc player can search for the recorded programs that are to be selectively reproduced from the disc.

A program reservation function is an example of using such a method. The program reservation function sequentially reproduces programs reserved in advance according to a specified sequence input by a user. Hence, the program reservation function enables the user to listen many different songs in succession, not necessarily in the order recorded on the discs.

However, since the player has only a single pickup device for reading signals written on a disc, the pickup must sequentially read the reserved programs, one by one. Also, since the programs are written on a disc in an arbitrary sequence dictated by the disc's manufacturer, the pickup requires some time to move to the starting point of the next program, after a program is reproduced. This time interval is an annoyance and inconvenience to the user.

The above problem is amplified in the case of a compact disc player which employs a disc changer. A disc changer can arbitrarily reproduce programs recorded on one disc among a plurality of loaded discs, to overcome the limitation of only reproducing the number of programs recorded on a single disc. There are two types of such a disc changers, one employing a jukebox and another employing a rotary disc base.

In the type of disc changer employing the rotary disc base, a disc, selected at the user's discretion, is obtained by spinning the rotary disc base which is equipped with multiple trays for loading discs along the circumference of the disc base. The compact disc player employing a disc changer does not need to change discs frequently, but when the two programs which are to be sequentially reproduced are recorded on different discs, the program searching time is much longer than that for programs contained on a single disc.

Accordingly, when a plurality of programs are being sequentially reproduced according to the reservation program function, after the preceding program is reproduced, there is a prolonged waiting period until the next program is reproduced.

SUMMARY OF THE INVENTION

To solve the above problems, it is an object of the present invention to provide a method of reproducing a reserved program which reduces the searching time for a reserved program.

It is another object of the present invention to provide a compact disc player employing the method of reproducing a reserved program.

Accordingly, to achieve the first object, there is provided a method of reproducing, with a compact disc player, a reserved program recorded on a disc, in which the compact disc player includes a device for reading the disc, in which the method of reproducing comprising the steps of: reading a first program from the disc; storing the first program in a memory; reproducing the first program stored in the memory; and moving the device for reading the disc to a location on the disc in which a second program is recorded, at the same time the first program is reproduced.

To achieve the second object, there is provided a compact disc player for reproducing programs stored on one or more discs, comprising: a pickup device for generating an electrical signal corresponding to a program signal recorded on one of the discs; a servo unit for moving said pickup device; a program buffer memory for storing the program signal generated by the pickup device; a signal converter for reproducing the stored program signal; and a controller for controlling the signal converter to reproduce the program signal stored in the program buffer memory and simultaneously controlling the servo unit to move the pickup device to a location corresponding to another recorded program.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
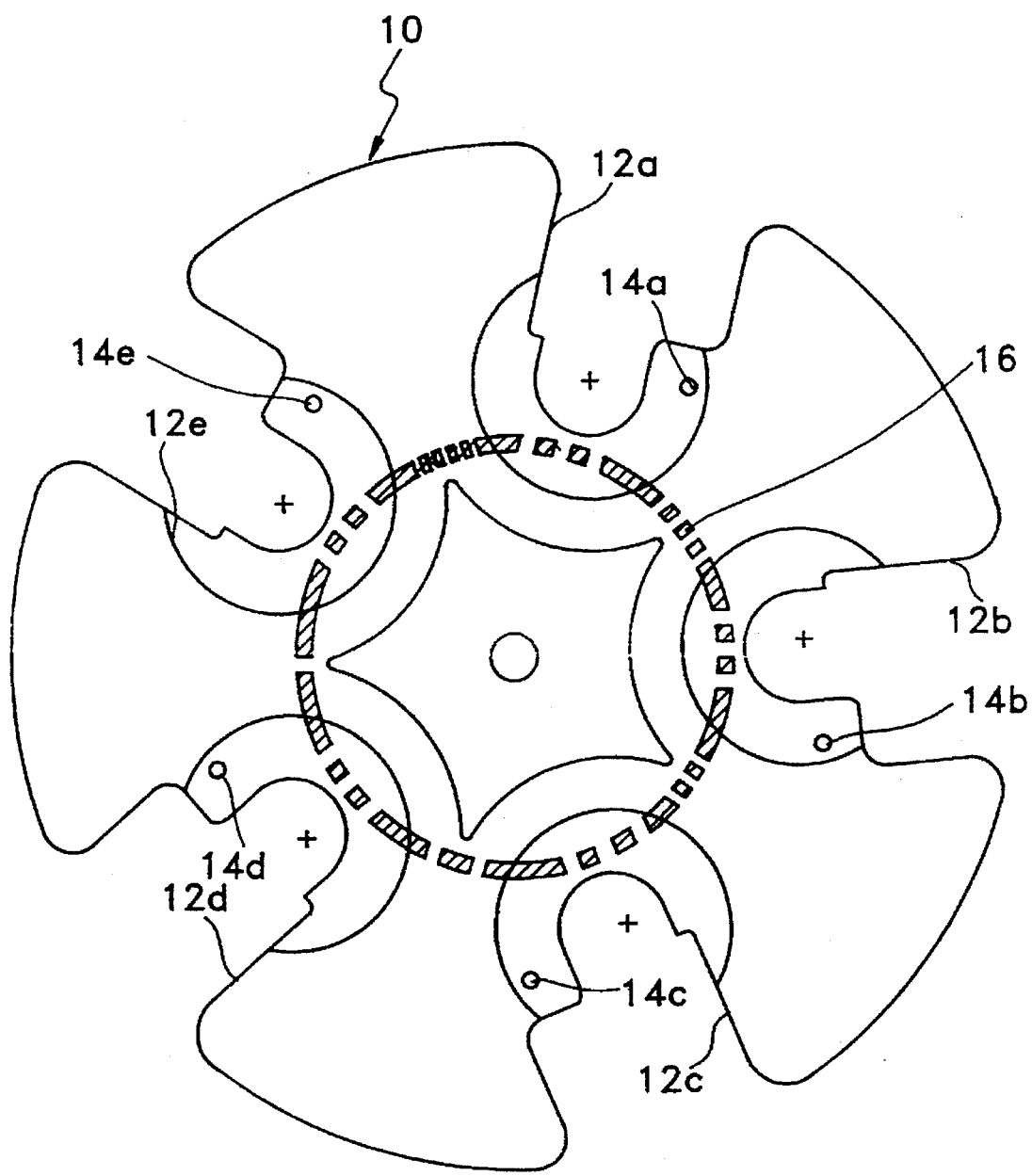
FIG. 1 is a view illustrating a rotary disc base in a disc changer.

FIG. 1 shows a rotary disc base on which discs are loaded in a disc changer. In FIG. 1, rotary disc base 10 is equipped with five trays 12a to 12e arranged in a circular pattern. Also, holes 14a to 14e are formed in a disc-seating surface area of each tray 12a to 12e, respectively, to provide for detection of the presence of a disc. That is, an optical signal is passed through the hole of the corresponding tray, and if a disc is present the optical signal is reflected from the surface of the loaded disc and thereby detected. To detect the identity of a tray (i.e., the tray number), a pattern of protrusions is provided in the form of a circular supporting wall 16 set into the base of rotary disc base 10 to maintain a rotary disc, whereby the particular pattern of protrusions near the tray indicates the tray identity.

Figure 2:
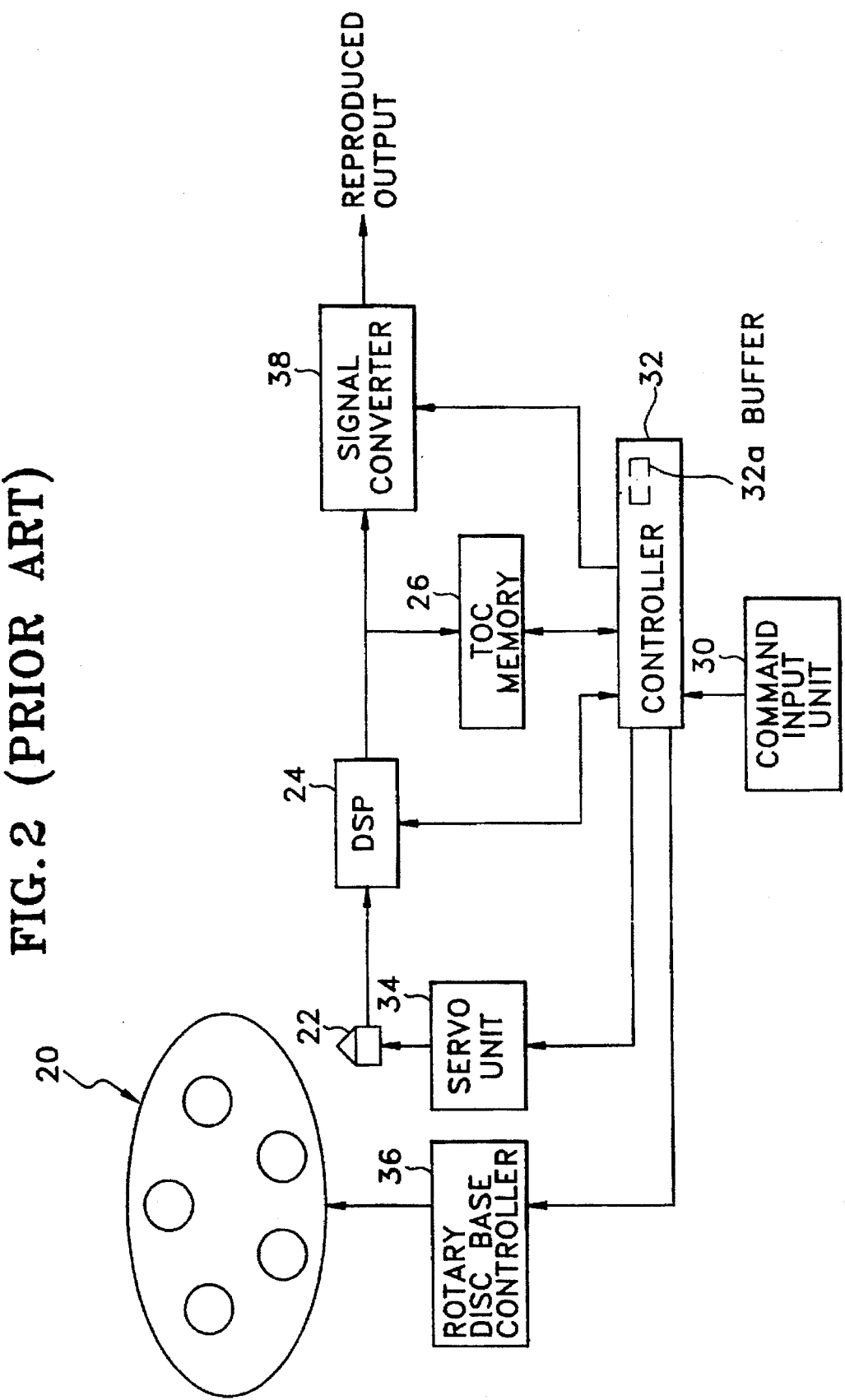
FIG. 2 is a block diagram illustrating a configuration of a prior-art compact disc player.

FIG. 2 shows a conventional reproducing device for a disc loaded on the rotary disc base shown in FIG. 1. In FIG. 2, reference numeral 20 refers to the rotary disc base of FIG. 1, reference numeral 22 refers to a pickup device for generating an electrical signal corresponding to the pits formed on a disc, and reference numeral 24 refers to a digital signal processor (DSP) for receiving the signal generated from the pickup device and outputting the signal after performing a descrambling and error-correcting process.

Reference numeral 26 refers to a TOC memory containing the table of contents (TOC) signal written in the lead-in area of the disc, which is present among the signals demodulated by DSP 24. Reference numeral 38 refers to a signal converter for performing a signal conversion process on the program signal generated from DSP 24 and outputting the converted signal, and reference numeral 30 refers to a command input unit for inputting program reservation information. Reference numeral 32 refers to a controller for controlling the process of reading and reproducing the program selected from the disc during the reproduction mode of a reserved program. Reference numeral 34 refers to a servo unit for operating a rotating servo mechanism of a spindle motor, a focusing servo mechanism of a pickup device, and an optical transmitting servo mechanism. Reference numeral 36 refers to a rotary disc base controller for controlling the rotation of rotary disc base 10.

In the operation of the circuit of FIG. 2, a user inputs the index number of a program through the command input unit 30 in order to reserve that program. The input index numbers are stored in the order entered, in a buffer 32a within controller 32. Controller 32 sequentially reads the data stored in buffer 32a to obtain an index number in order to subsequently retrieve the tray number for the disc containing a selected program and the leading address of the selected program on the disc.

TOC memory 26 contains the TOC information which is read from the disc when a disc is loaded into a tray, and the tray number of each disc. Controller 32 provides the tray number to rotary disc base controller 36 and locates pickup device 22 at the starting location of the disc containing the selected program, by allocating the leading address to servo unit 34.

Thereafter, pickup device 22 generates an electrical signal corresponding to the pit signal recorded on a disc, and provides the generated signal to DSP 24. DSP 24 receives the signal from pickup device 22 and provides the received signal to signal convertor 38 after performing a descrambling and error-correcting process.

Signal convertor 38 converts the digitally encoded program signal provided from DSP 24, into an analog signal in order to output the converted signal.

Figure 3:
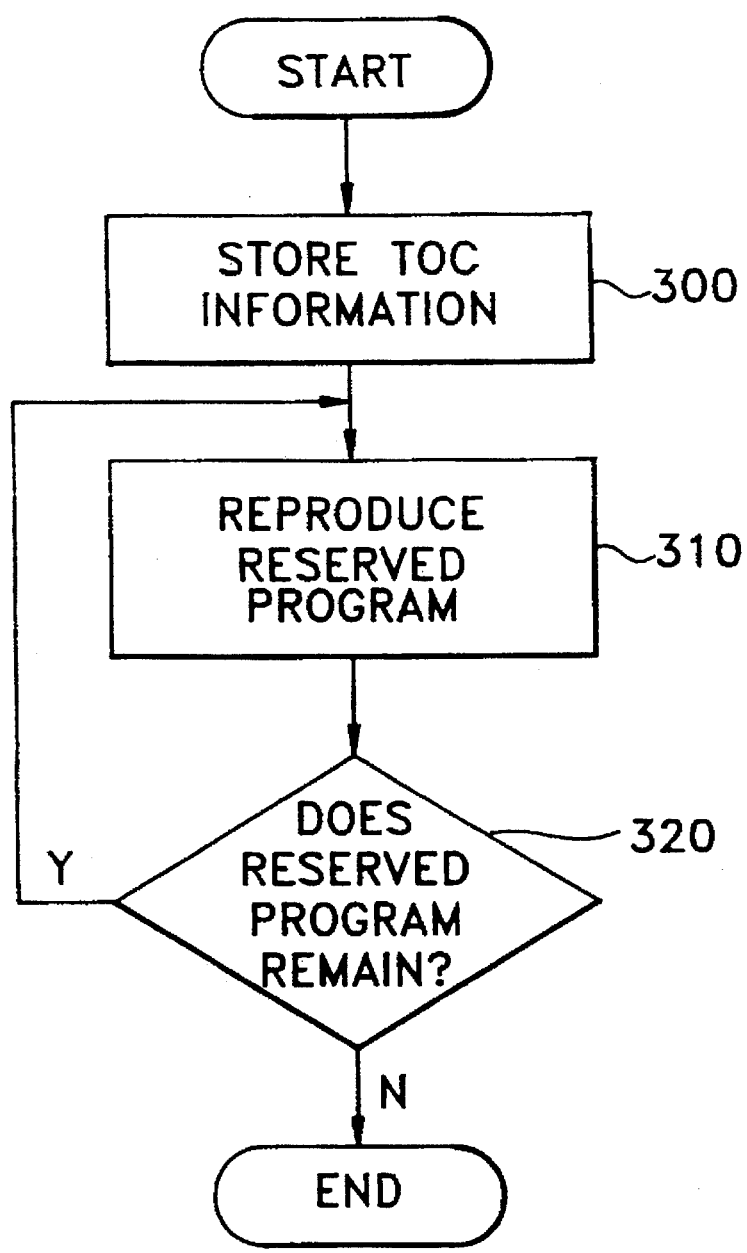
FIG. 3 is a flowchart illustrating a prior-art reproducing method of a reservation program.

FIG. 3 is a flow chart showing the method of reproducing a reserved program according to the apparatus of FIG. 2.

In step 300, when a disc is loaded, the TOC of the loaded disc is read from the disc and stored in TOC memory 26.

In step 310, the first reserved program is reproduced. Here, controller 32 obtains an index number of the first reserved program from buffer 32a, and a tray number and leading address corresponding to the index number according to the TOC information stored in TOC memory 26. The tray number and the leading address are provided to rotary disc base controller 36 and servo unit 34, respectively. Thus, pickup device 22 is positioned at the starting location of the disc containing the selected program. Here, the disc containing the selected program is placed into a clamping device (not shown) by rotating the rotary disc base. After the clamping device clamps the disc, the servo unit 34 begins to rotate the disc. Controller 32 controls servo unit 34 to move pickup device 22, and simultaneously, checks whether the pickup device is located at the starting location of the selected program by detecting the signal provided from DSP 24. Controller 32 also controls servo unit 34 to rotate the disc itself, and DSP unit 24 outputs the signal from the pickup device after performing the descrambling and error correcting process. The program signal generated from DSP 24 is provided to signal convertor 38, where the signal is converted into an analog signal to be sent to an audio reproducing apparatus (not shown), such as a speaker. Also, controller 32 checks for termination of the program by checking the signal provided from DSP 24.

In step 320, the existence of a reserved program to be reproduced is determined by inspecting buffer 32a for the presence of another index for a reserved program. If no reserved program remains, i.e., all the reserved programs have been reproduced, then reproduction of the reserved programs ends. If an index number of a reserved program remains in buffer 32a, the process returns to step 300.

As shown in FIG. 3, in a conventional reproducing method of reproducing a reserved program, after each program ends, pickup device 22 is moved to the starting location of the next program, which causes the problem of having to incur a prolonged waiting period between reproduction of programs. That is, as shown in steps 310 and 320, after the preceding program ends pickup device 22 is forced to wait during the time it moves to the starting location of the next program before reading the next program. In the case of the next program being recorded on the same disc containing the preceding reproduced program, the program search time is not so long, but when the next program is contained on a different disc the searching time is much longer.

Figure 4:
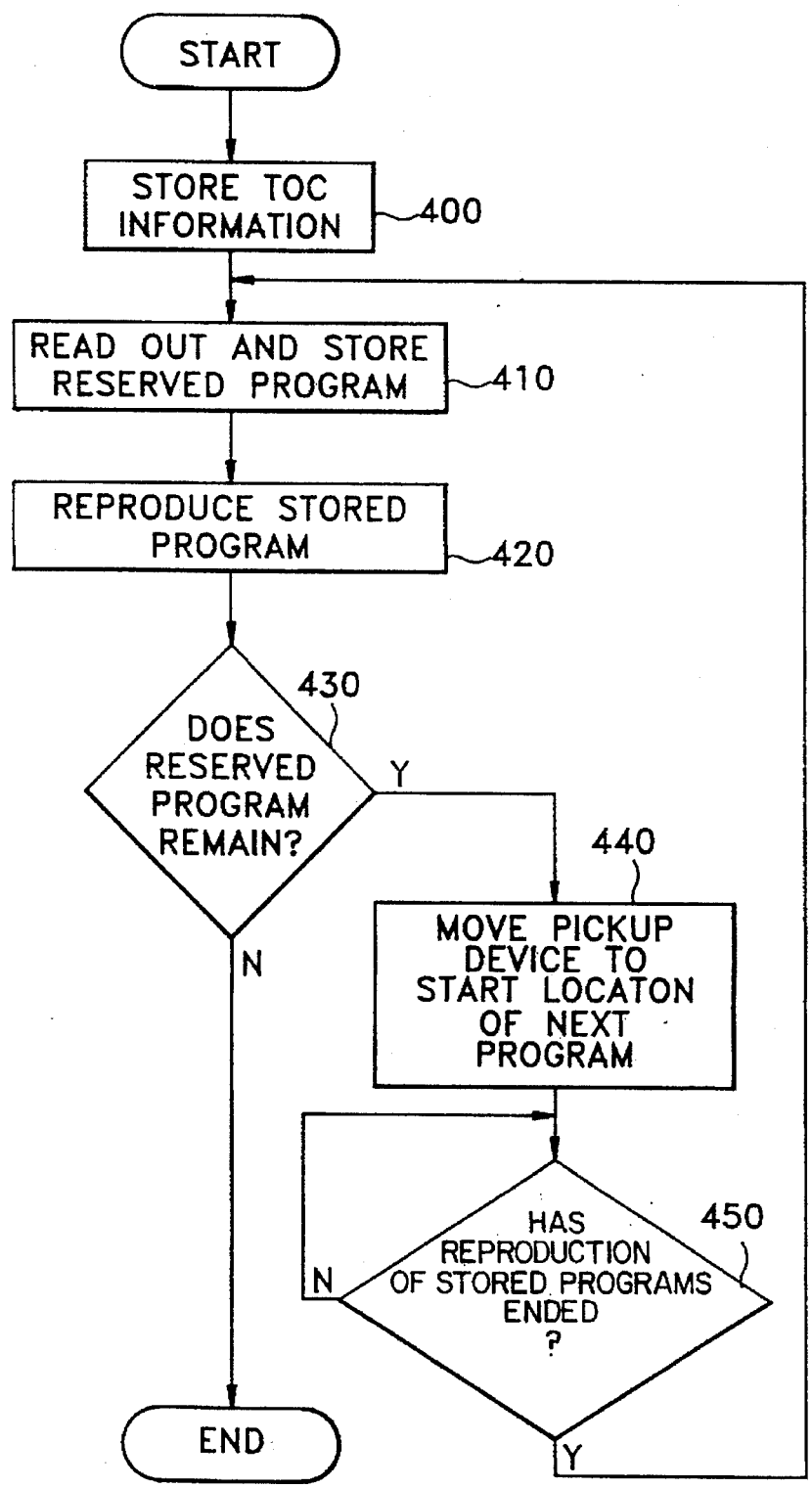
FIG. 4 is a flowchart illustrating a reproducing method of a reserved program according to the present invention.

FIG. 4 shows a method of reproducing a reserved program according to the present invention.

Figure 5:
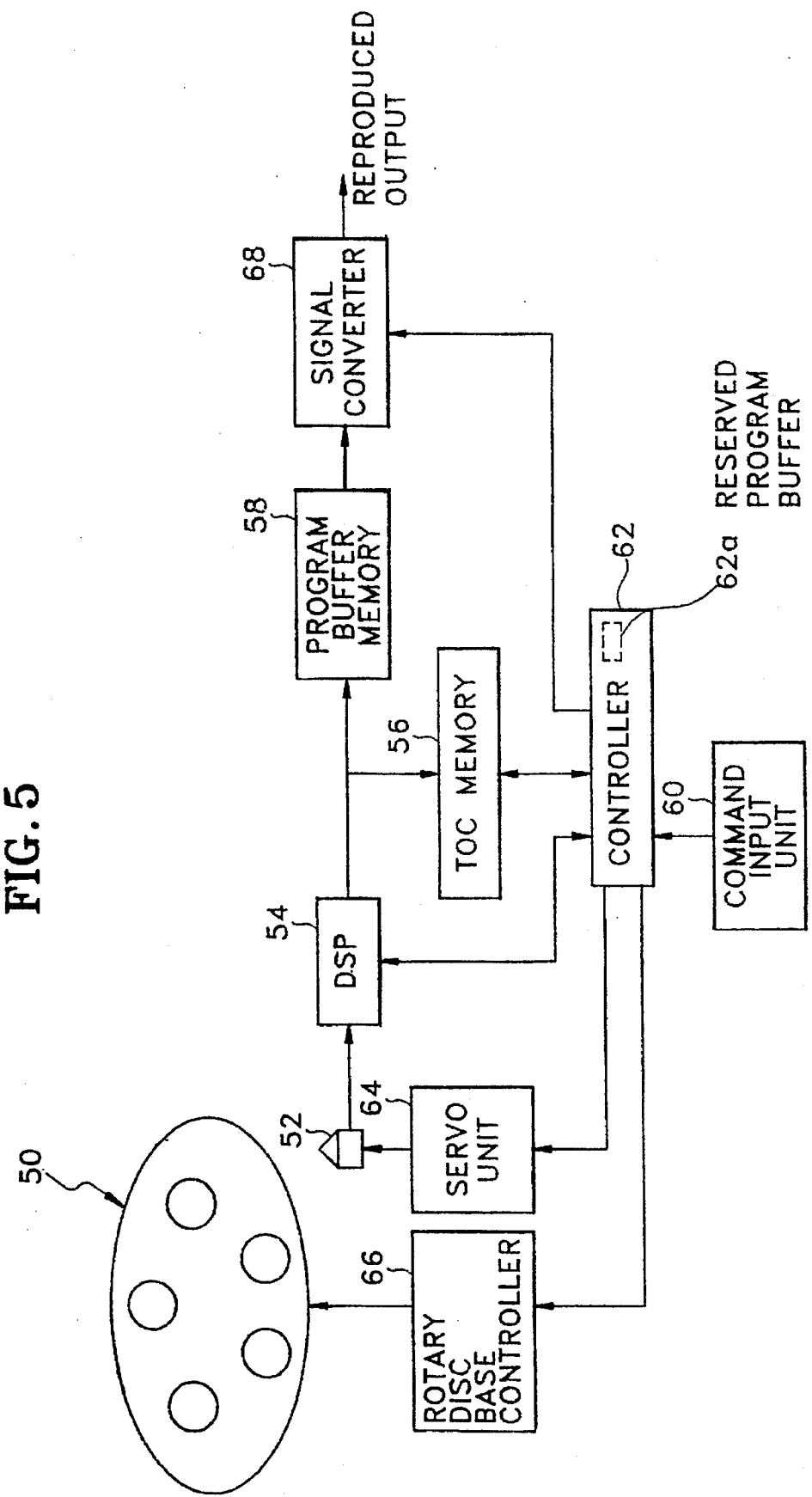
FIG. 5 is a block diagram illustrating the configuration of a compact disc player adopting the reproducing method of FIG. 4.

In step 400, when a disc is loaded, the TOC of a disc is read and stored in a TOC memory 56, as shown for example, in FIG. 5.

In step 410, the first reserved program for the loaded disc is read and stored in a program buffer memory 58.

In a reservation mode, the index number of reserved programs input by a user through the command input unit 60 are sequentially recorded in the reserved program buffer 62a. In a reproduction mode the controller 60 sequentially reproduces the reserved programs written into the reserved program buffer 62a. When the tray number and the leading address of each of the loaded discs containing a program corresponding to an index number are obtained, the pickup device is moved to the next program's starting location in order to read the program. The read program is recorded in the program buffer memory 58.

In step 420, the program recorded in the program buffer memory 58 is reproduced.

The signal convertor 68 reads the program signal stored in the program buffer memory 58, converts the signal into an analog signal, and outputs the converted signal.

In step 430, the existence of any remaining reserved program is determined by inspecting the reserved program buffer 62a. If no reserved program remains, reproduction of reserved programs ends.

In step 440, if a reserved program remains to be reproduced, the pickup device is moved to the starting location of the next reserved program.

In step 450, the program buffer memory 58 is checked to determine if reproduction of the stored program has ended. Here, if the program stored in the program buffer memory 58 has been completely reproduced the process returns to step 410. Then, subsequent programs are stored in the program buffer memory 58 and reproduced. However, if reproduction of the program stored in the program buffer memory 58 has not ended, then the process waits for the reproduction to end.

In step 440, while the program contents stored in the program buffer memory 58 are being reproduced through the signal converter 68, the pickup device 52 is moved to the starting location of the next reserved program, which results in a sharp reduction in the waiting time between programs. That is, the conventional program reproducing method by which the starting location of the next program is searched only after the reproduction of the preceding program ends, results in a long waiting time due to the program search. On the other hand, in the present invention, by reading a program and storing it in a program buffer memory 58, a pickup device can be moved to the starting location of a subsequent program at the same time the program stored in the program buffer memory 58 is being reproduced, thereby resulting in a sharp reduction of the program search waiting time.

Moreover, there is no need for the memory capacity associated with step 410 to be equal to or larger than the total memory capacity of a program. The operation of the present invention can reduce the required time during program searching, so that the program buffer memory 58 requires only as much memory capacity as that corresponding to the maximum time needed to perform a program search. When the capacity of the program buffer memory 58 is less than the memory capacity of a program, a memory paging system, commonly used in computer systems, can be employed.

FIG. 5 shows the configuration of a compact disc player adopting the method of reproducing a reserved program according to the present invention. The detailed explanation of FIG. 5 is abridged because it is essentially the same as that of FIG. 2, except for program buffer memory 58.

To reserve a program a user inputs the index number of a recorded program through command input unit 60. The input index numbers are sequentially stored in reserved program buffer 62a of controller 62. Controller 62 sequentially reads the contents stored in reserved program buffer 62a in order to obtain the tray number of a disc containing a selected program and the leading address of the selected program on that disc, by referring to the TOC information stored in TOC memory 56.

TOC memory 56 contains the TOC information written on a lead-in area of the disc and the tray number of each disc, all of which is stored in the TOC memory 56 when a disc is loaded. Controller 62 provides the tray number to rotary disc base controller 66 and moves pickup device 52 to the starting location of the disc containing the selected program, by sending the leading address to servo unit 64.

Thereafter, pickup device 52 reads out an electrical signal corresponding to the pit signal written on the disc, to send the signal to DSP 54. DSP 54 receives the signal from pickup device 52 and sends the received signal to program buffer memory 58 after performing a descrambling and error-correcting process. Signal convertor 68 reads out the program signal stored in program buffer memory 58 and converts the program signal into an analog signal to output the converted signal to an audio reproducing apparatus (not shown).

While the program signal is being reproduced and output through signal converter 68, controller 62 reads the next program index number stored in reserved program buffer 62a, and obtains the tray number of the disc containing the selected program and the leading address of the selected program on the disc. The tray number and leading address of the selected program are obtained by referring to the TOC stored in TOC memory 56, based on the index number read from the reserved program buffer 62a.

Controller 62 provides the tray number to rotary disc base controller 66 and moves pickup device 52 to the starting position of the disc containing the selected program, by sending the leading address to servo unit 64.

As described above, a method of reproducing a reserved program according to the present invention reduces the program search waiting time by moving the pickup device to the starting location of the next program to be reproduced, while at the same time the program stored in the program buffer memory is being reproduced. Thus, the next reserved program is reproduced very quickly after reproduction of the program stored in the program buffer memory ends.

What is claimed is:

1. A method of reproducing, with a compact disc player having a table of contents (TOC) memory, a reserved program recorded on a disc, in which the compact disc player includes a device for reading the disc, said method of reproducing comprising the steps of:

(a) reading TOC information stored on the disc, and storing the read TOC information in the TOC memory;

(b) reading a first program from the disc based on said TOC information stored in said TOC memory and storing the first program in a program memory;

(c) reproducing the first program stored in the program memory; and (d) determining the location of a second program based on said TOC information stored in said TOC memory and moving the device for reading the disc to the determined location on the disc in which said second program is recorded while the first program is reproduced.

2. The method according to claim 1, further comprising the step of (e) storing the second program in the memory while the first program is reproduced.

3. The method according to claim 1, wherein the second program is stored on another disc different from the disc on which the first program is recorded, and in step (d) the device is moved to a location on the other disc in which the second program is recorded, at the same time the first program is reproduced.

4. The method according to claim 3, further comprising the steps of:

(f) selecting programs recorded on the discs loaded into the compact disc player;

(g) reproducing the selected programs according to steps (a) through (d) until all of the selected programs are reproduced.

5. A method of reproducing with a compact disc player a reserved program recorded on a disc, in which the compact disc player includes a table of contents (TOC) memory containing TOC information stored on the disc and a program buffer memory for buffering and outputting a program signal reproduced from the disc, said reproducing method comprising the steps of:

reading the TOC information stored on a disc loaded in the compact disc player, and storing the read TOC information in the TOC memory;

reading the reserved program recorded on the disc and storing the read program in the program buffer memory;

reproducing and outputting the program stored in the program buffer memory, and moving a pickup device to the starting location of a next reserved program according to the TOC information stored in the TOC memory while the stored program is reproduced and output; and reading a reserved program from the location of said pickup device and storing the read program in said program buffer memory after reproduction of the reserved program stored in said program buffer memory ends.

6. A compact disc player comprising:

a pickup device for generating an electrical signal corresponding to a signal recorded on a disc;

a servo unit for moving said pickup device;

a digital signal processor for receiving the signal generated by said pickup device, descrambling and error-correcting the signal, and outputting the descrambled and error-corrected signal;

a signal converter for converting the program signal output from said digital signal processor into an analog signal; and a controller for controlling reproduction of a reserved program;

a program buffer memory for storing the program signal provided from said digital signal processor, and outputting the stored signal to said signal convertor; and a table of contents (TOC) memory for storing TOC information recorded on the disc, wherein said controller reads the TOC information of the disc and stores the TOC information in the TOC memory, reads a reserved program recorded on the disc and stores the read program in said program buffer memory, reproducers and outputs the program stored in said program buffer memory by controlling said signal convertor, and moves the pickup device to the starting location of the next reserved program according to the TOC information stored in said TOC memory simultaneously with reproducing the program stored in said program buffer memory, and reads out a reserved program from the location of said pickup device to store the read-out program in said program buffer memory after the reproduction of the reserved program stored in said program buffer memory ends.

7. The compact disc player according to claim 6, wherein said servo unit moves said pickup device by operating a spindle servo, a focusing servo, and a tracking servo.

8. The method according to claim 1, further comprising the step of:

e) reading said second program from the disc and storing said second program in said program memory after said first program is completely reproduced.

* * * * *